United States Patent

[11] 3,607,016

[72] Inventors Filippo Barilli;
Giorgio Cozza; Giancarlo Aglietti;
Ferdinando Ligorati, all of Milan, Italy
[21] Appl. No. 778,765
[22] Filed Nov. 25, 1968
[45] Patented Sept. 21, 1971
[73] Assignee Societa' Italiana Resine S.p.A.
Milan, Italy
[32] Priority Nov. 29, 1967
[33] Italy
[31] 23262-A/67

[54] PROCESS FOR RECOVERING SODIUM
FLUOSILICATE IN THE PRODUCTION OF
PHOSPHORIC ACID
13 Claims, No Drawings

[52] U.S. Cl.................................................. 23/88,
23/165
[51] Int. Cl....................................................C01b 25/22,
C01b 33/00
[50] Field of Search........................................ 23/88, 50,
107, 165 B

[56] References Cited
UNITED STATES PATENTS
2,271,712  2/1942  Peirce .......................... 23/107
3,462,242  8/1969  Barker et al. ................. 23/88
3,493,336  2/1970  Milling .......................... 23/107
3,506,394  4/1947  Okamura et al. ............. 23/88

Primary Examiner—Herbert T. Carter
Attorney—Sughrue, Rothwell, Mion, Zinn & Macpeak ABSTRACT: A process for preparing sodium fluosilicate comprising treating mineral phosphates with an excess amount of aqueous sulfuric acid, removing excess sulfate from the resulting solution by precipitating the excess sulfate in the form of calcium sulfate by adding to the solution a stoichiometric quantity to said sulfate of phosphorites at a temperature of from 50° to 80° C., and then curing the precipitate at a temperature of from 20° to 40° C. for a period of time of from 1 to 5 hours, and then precipitating fluorine and silica from the solution in the form of sodium fluosilicate, after separating calcium sulfate therefrom, by adding monosodium phosphate, bisodium phosphate or a mixture thereof to the solution in a quantity such that the atomic ratio of the sodium contained in the mono- or bisodium phosphate to the fluorine contained in the solution is within the range of from 1:1 to 2.5:1, the precipitation being carried out at a temperature of from 40° to 100° C.

PROCESS FOR RECOVERING SODIUM FLUOSILICATE IN THE PRODUCTION OF PHOSPHORIC ACID

The invention relates to the preparation of sodium fluosilicate, for use for example in the glass industry.

Sodium fluosilicate can be prepared by causing silicon fluoride to act on a sodium fluoride solution, the resulting salt being practically insoluble in the fluoride solution.

Sodium fluosilicate can also be obtained as a byproduct of the manufacture of phosphoric acid from mineral phosphates operating in the gaseous phase or, more frequently, in the liquid phase.

When one is operating in the gaseous phase the gases obtained by acidification or calcination of the mineral phosphates are washed with water, which absorbs the fluorinated compounds contained in the gases in the form of an acidic solution which is subsequently neutralized.

Though satisfactorily pure products can be obtained by this process, serious disadvantages occur due chiefly to high corrosion and low yields.

With the aqueous phase technique the fluosilicate is obtained by precipitation, by means of sodium hydrate, of the fluosilicic acid contained in the solution from the treatment of mineral phosphates with sulfuric acid.

As compared with the vapor phase technique, the process, while affording improvements in fluosilicate yields, leads to products of an appreciably lower purity.

The process of the invention, as described below, is improved over these techniques.

The treatment in the hot of finely ground mineral phosphates with aqueous sulfuric acid exceeding the stoichiometric quantity for setting free the phosphoric acid, leads to an aqueous phosphoric acid solution which is impure through the presence of sulfuric acid as well as fluosilicic acid, compounds of iron, aluminum, vanadium, arsenic, calcium, and magnesium, and organic substances. The presence of excess sulfuric acid is due to the fact that under these conditions calcium ions are present in a very small quantity in the phosphoric solution.

The excess sulfuric acid can be removed by adding barium carbonate to the phosphoric acid solution. Desulphatation is satisfactory enough; however, the reagent is expensive and the very fine resulting barium sulfate precipitate is difficult to separate.

In the process of the invention, which is defined fully below, in the preferred form, the phosphate solutions arising from the sulfuric acid treatment, after the solid attack residues have been removed, are admixed, preferably while hot, with a quantity of finely subdivided mineral phosphate, preferably in exactly stoichiometric amount corresponding to the excess sulfuric acid.

The precipitation of calcium sulfate is preferably assisted by adding a certain quantity of calcium sulfate crystals recycled to the process, and is preferably carried out at a temperature between 50° and 80° C., preferably 60° to 70° C., by adding a quantity of calcium sulfate crystals amounting to 2 to 8 percent weight of the solution. The best results are obtained with 3 to 5 percent of calcium sulfate. After stirring, the suspension is cooled, preferably by allowing the precipitate to cure over 1 to 5 hours, the temperature being between 20° and 40° C. On completion of the precipitation the liquid is separated from the solid phase by any of the conventional processes (filtering, decanting, centrifuging).

After the removal of the calcium sulfate the prior art suggests that it is possible to obtain the fluosilicate by precipitation with sodium hydroxide of the fluosilicic acid contained in the raw solution.

Though yields are rather good, the product is very impure through the further substances present in a large number in the solution, which precipitate on addition of the sodium hydroxide. Moreover, the sodium hydroxide forms with certain impurities present in the raw solution gels which are difficult to separate by filtering.

On account, moreover, of the nonfully quantitative precipitation of the sodium fluosilicate, appreciable fluorine quantities remain in the solution, which cannot subsequently be removed.

This impairs the purity of the phosphoric acid obtainable by further purification.

The best processes lead to a fluorine content in the solution around 1 g./l. or more, which is decidedly a nonnegligible quantity when preparing polyphosphates of high purity.

It has now been surprisingly found that it is advantageous to treat, preferably in the hot, the solution from which calcium sulfate has been precipitated, with mono- and/or polysodium phosphates alone or jointly, preferably in solution. This is all the more surprising as other sodium compounds do not give satisfactory results.

Accordingly, the full process of the invention is a process for preparing sodium fluosilicate, characterized by:

i. treating fluoride- and silicate-bearing mineral phosphate with excess sulfuric acid in solution
ii. removing excess sulfate
iii. precipitating the sodium fluosilicate from the resulting phosphate-, silicate- and fluoride-containing solution by addition of phosphate selected from mono- and polysodium phosphates and mixtures thereof.

Suitably the sodium fluosilicate is precipitated at at least 98 percent purity and the phosphate solution remaining after the precipitation at most contains 1 g./l. fluoride (as $F^1$) and 0.5 g./l. silicate (as $SiO_2$).

Desirably the aqueous solution to which phosphate is added contains 200 to 450 g./l. phosphate (as $P_2O_5$), up to 35 g./l. fluoride (as $F^1$) and up to 18 g./l. silicate (as $SiO_2$).

By the use of processes within the invention the sodium fluorosilicate can be obtained in the form of highly desirable small white crystals which are separated from the solution by filtering, preferably hot. The crystals can subsequently be washed with lukewarm water, then dried.

This leads to a product of high purity with substantially quantitative yields.

The precipitating and filtering temperature may vary within a rather wide range, generally between 40° C. and 100° C. The best results are obtained when the precipitating and filtering temperature is between 60° and 80° C.

A number of experimental tests have shown that the optimum conversion values are reached, other conditions being equal, when a quantity of mono- and/or polysodium phosphates alone or jointly is added such that the Na/F ratio is between 1:1 and 2.5:1.

According to one embodiment of the invention mono- and/or bisodium phosphates, preferably in an aqueous solution are employed.

The phosphate products from partial neutralization of the phosphoric acid from a subsequent stage may be recycled as the precipitating phosphate.

The sodium fluosilicate crystals are preferably washed at a temperature between 20° and 40° C.

By the process of the invention in preferred form the sodium fluosilicate and phosphoric acid can thus be obtained separately in a substantially pure condition.

After separately removing the main impurities, namely sulfuric and fluosilic acids, the phosphoric solution is freed from further impurities present in a smaller quantity by conventional processes, finally by part conversion to salt form by means of 50 percent sodium hydroxide.

The phosphates can be recycled in part, as mentioned above, for the purpose of precipitating the sodium fluosilicate. This leads with high yields to a product of high purity, which is particularly suited for preparing ortho, pyro or other alkali polyphosphates for use for example in detergent production.

The invention is of particular advantage in that in preferred form it supplies sodium fluosilicate and phosphoric acid with high yields in a highly pure condition by a simple and inexpensive process by virtue of the low cost of the starting material and certain convenient measures such as the use of the starting material itself for precipitating sulfuric acid from the solution and the recycling of the phosphates for precipitating sodium fluosilicate.

Further important advantages reside in the reduction of corrosion and fouling and the simplicity of the apparatus.

The invention is illustrated by the following examples.

EXAMPLE 1

150 kg. of a raw solution, density 1.226, obtained by treatment of a phosphorite with sulfuric acid, of the following composition

| $P_2O_5$ | 22.7% | $Fe_2O_3$ | 0.5% |
|---|---|---|---|
| $SO_4^{ii}$ | 1.4% | MgO | 0.1% |
| $F^1$ | 0.75% | $Al_2O_3$ | 0.15% |
| CaO | 0.3% | V | 130 p.p.m. |
| $SiO_2$ | 0.45% | As | 10 p.p.m. | were admixed at 67° C. while stirring with 2.4 kg. phosphorite with a CaO, $P_2O_5$ and $F^1$ content of 51.1 percent, 32.1 percent and 2.255 percent, respectively, ground and sieved through a 0.088 mm. mesh sieve, as well as with 6 kg. anhydrous calcium sulfate.

The resulting suspension was allowed to cure for 3 hours at 40° C. and was then filtered at 40° C.

The resulting solution heated to 75° C. was admixed with 17 kg. of a 50 percent by weight aqueous solution of sodium phosphates, wherein the Na/P ratio was about 2:1.

The fluosilicate readily precipitated in the form of small white crystals which were filtered at 75°, washed three times with lukewarm water, then dried.

1,890 g. approximately of sodium fluosilicate at a concentration of 98.5 percent were obtained.

After filtering the fluosilicate the solution was concentrated till a reduction in volume by about 50 percent was obtained by operating in vacuum at 400 torr and in a nitrogen stream in order to avoid superheating preventing a smooth distillation.

A product was obtained, which was admixed with 100 g. coal dust, 18 g. pig iron and 250 g. sodium sulfide.

The product was allowed to stand at a temperature of about 80° C. for 30 minutes and was then filtered, whereby the calcium sulfate still present in the solution, the arsenic in the form of sulfide and any traces of organic substances present were precipitated The resulting solution was adjusted to pH 7.5 with 50 percent NaOH, the temperature being maintained at 105° C.

The neutralization precipitates from the phosphoric acid solution converted in part to salt form the impurities still present such as V, Ca, Fe, Al and Mg which were then filtered at 105° C. A solution of phosphoric acid converted in part to salt form was obtained, which contained 315 g./l. approximately $P_2O_5$, and contained fluoride ion and $SiO_2$ below 0.2 and 0.1 g./l., respectively.

EXAMPLE 2

150 kg. of a raw solution, density 1.274, of the following composition:

| $P_2O_5$ | 26.3% | $Fe_2O_3$ | 0.7% |
|---|---|---|---|
| $SO_4^{ii}$ | 1.8% | MgO | 0.25% |
| $SiO_2$ | 0.5% | $Al_2O_3$ | 0.3% |
| $F^1$ | 0.90% | V | 110 p.p.m. |
| CaO | 0.15% | As | 50 p.p.m. | were admixed while stirring at 70° C. with 3.1 kg. phosphorite with a content of CaO, $P_2O_5$ and $F^1$ of 51.6 percent, 33.4 percent and 2.45 percent, respectively, ground and sieved as in the preceding example, and with 4.5 kg. anhydrous calcium sulfate.

A suspension was obtained which was allowed to stand for 5 hours at 40° C., and subsequently filtered under the same temperature conditions.

The solution heated to 80° C. was admixed with 23.4 kg. of a 50 percent aqueous solution of sodium phosphates, wherein the Na/P ratio was about 2:1.

The crystalline fluosilicate precipitated and was filtered under the same temperature conditions, and repeatedly washed with lukewarm water, then dried. A quantity of 2,300 g. approximately of 98 percent fluosilicate was obtained.

The concentration of the solution and removal of impurities such as arsenic, organic substances and calcium sulfate residue were carried out as described in example 1.

After neutralizing the solution to pH 7.5 and subsequently filtering it, a solution of mono- and disodium phosphates was obtained, containing about 380 g./l. $P_2O_5$, fluoride ion and silica being below 0.1 g./l.

EXAMPLE 3

150 kg. of the raw solution of example 1 were admixed after precipitating the calcium sulfate by the same measures, at a temperature of 75° C. with 35 kg. of an aqueous 30 percent by weight solution of sodium phosphates, in which the Na/P ratio was about 1:1. In this case also the fluosilicate readily precipitated, was repeatedly washed with lukewarm water, and was then dried. 1,870 g. approximately of sodium fluosilicate at a concentration of 98 percent were obtained.

After the solution had been submitted to the same treatments as in example 1 it was found to contain 310 g./l. $P_2O_5$ approximately and less than 0.2 and 0.1 g./l. iron and silica, respectively.

What we claim is:

1. In a method for the wet preparation of phosphoric acid comprising treating mineral phosphates with an excess amount of aqueous sulfuric acid, removing excess sulfate from the resulting solution and precipitating fluorine and silica from the solution in the form of sodium fluosilicate by the addition of a sodium salt thereto, the improvement consisting of:
   a. precipitating said excess sulfate in the form of calcium sulfate by adding to the solution a stoichiometric quantity, to said sulfate, of phosphorites, at a temperature of from 50° to 80° C., and then curing the precipitate at a temperature of from 20° to 40° C. for a period of from 1 to 5 hours, and then,
   b. precipitating from the resulting solution, after separating calcium sulfate therefrom, fluorine and silica in the form of sodium fluosilicate by adding monosodium phosphate, bisodium phosphate or a mixture thereof to the resulting solution in a quantity such that the atomic ratio of the sodium contained in the mono- or bisodium phosphates to the fluorine contained in the solution is within the range of from 1:1 to 2.5:1, the precipitation being carried out at a temperature of from 40° to 100° C.

2. The method of claim 1 where the precipitated calcium sulfate which is removed from the solution is recycled to the solution prior to the calcium sulfate precipitation step in an amount of from 2 to 8 percent by weight of the solution, said calcium sulfate precipitation being carried out at a temperature of from 60° to 70° C.

3. The method of claim 2 wherein the calcium sulfate is recycled to the solution in a quantity of from 3 to 5 percent by weight of the solution.

4. The method of claim 1 wherein the solution to which the mono- or bisodium phosphates are added contains from 200 to 450 g./l. of phosphate as $P_2O_5$, up to 35 g./l. of fluoride as $F^1$, and up to 18 g./l. of silicate as $SiO_2$.

5. The method of claim 1 wherein the temperature of precipitation of said sodium fluosilicate varies from 60° to 80° C.

6. The method of claim 1 wherein said mono- or bisodium phosphates are added in the form of an aqueous solution thereof.

7. The method of claim 1 wherein said sodium fluosilicate is precipitated in the form of crystals and wherein said crystals are separated from the solution by filtering at a temperature of from 40° to 100° C., subsequently washed with water at a temperature of from 20° to 40° C. and dried.

8. The method of claim 7 wherein said crystals are filtered at a temperature of from 60° to 80° C.

9. The method of claim 1 wherein the phosphate solution which results after the precipitation of said sodium fluosilicate is recycled to the solution which results from the calcium sulfate precipitation as the phosphate used to precipitate said sodium fluosilicate.

10. The method of claim 1 wherein said sodium fluosilicate is precipitated in at least 98 percent purity and wherein the phosphate solution which results after the precipitation of said sodium fluosilicate contains not more than 1 g./l. of fluoride as $F^1$ and not more than 0.5 g./l. of silicate as $SiO_2$.

11. The method of claim 1 wherein said phosphorite has a composition comprising from about 51.1 to about 51.6 percent CaO, from about 32.1 to about 33.4 percent $P_2O_5$, and from about 2.255 to about 2.45 percent $F^1$.

12. The method of claim 1 wherein the stoichiometric quantity of phosphorites corresponds to the excess amount of sulfuric acid present after treatment of said mineral phosphates with the aqueous sulfuric acid.

13. The method of claim 1 wherein said phosphorites are finely divided.